United States Patent
Johnson et al.

(10) Patent No.: US 10,032,186 B2
(45) Date of Patent: *Jul. 24, 2018

(54) NATIVE APPLICATION TESTING

(71) Applicant: Facebook, Inc., Menlo Park, CA (US)

(72) Inventors: Michael Dudley Johnson, San Mateo, CA (US); Mathieu Benjamin Tozer, San Francisco, CA (US); Breno Pompeu Roberto, Santa Clara, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/006,477

(22) Filed: Jan. 26, 2016

(65) Prior Publication Data

US 2016/0140600 A1   May 19, 2016

Related U.S. Application Data

(63) Continuation of application No. 13/948,893, filed on Jul. 23, 2013, now Pat. No. 9,305,322.

(51) Int. Cl.
*G06F 15/16* (2006.01)
*G06Q 30/02* (2012.01)
(Continued)

(52) U.S. Cl.
CPC ......... *G06Q 30/0242* (2013.01); *G06F 11/36* (2013.01); *G06Q 30/0201* (2013.01); *G06Q 30/0277* (2013.01); *G06Q 50/01* (2013.01)

(58) Field of Classification Search
CPC ... G06Q 30/02; H04L 29/08072; H04L 29/06; H04L 29/0809; H04L 29/08981;
(Continued)

(56) References Cited

U.S. PATENT DOCUMENTS 5,918,014 A   6/1999   Robinson
6,539,232 B2   3/2003   Hendrey
(Continued)

FOREIGN PATENT DOCUMENTS

EP   2554226 A2   2/2013
JP   2014-507036 A   3/2014

OTHER PUBLICATIONS

Japanese Office Action received from the JPO for Japanese Patent Application No. 2016-516507, dated Jun. 28, 2016.
(Continued)

*Primary Examiner* — Mahran Abu Roumi
(74) *Attorney, Agent, or Firm* — Baker Botts L.L.P.

(57) ABSTRACT

In one embodiment, a method includes deploying an application to a plurality of client systems associated with a plurality of users, respectively, wherein the application is installed on each of the client systems, and wherein one or more treatments can be remotely activated on the application, receiving, from a first client system associated with a first user of the plurality of users, a request from the application installed on the first client system to access the application server, determining whether the first user belongs in a treatment group associated with a first treatment, remotely activating the first treatment on the first client system associated with the first user if the first user belongs in the treatment group, and synchronizing activation of the first treatment in response to subsequent access by the first client system.

39 Claims, 4 Drawing Sheets

(51) Int. Cl.
  *G06F 11/36* (2006.01)
  *G06Q 50/00* (2012.01)
(58) Field of Classification Search
  CPC .............. A63F 2300/50; A63F 13/12; A63F 2300/407; G07F 17/323; G07F 17/32; G06F 11/3636; G06F 11/3664; G06F 11/3688; G06F 11/3676; G06F 11/3684
  USPC ........................................................ 709/217
  See application file for complete search history.

(56) References Cited

U.S. PATENT DOCUMENTS

| | | |
|---|---|---|
| 6,957,184 B2 | 10/2005 | Schmid |
| 7,069,308 B2 | 6/2006 | Abrams |
| 7,379,811 B2 | 5/2008 | Rasmussen |
| 7,539,697 B1 | 5/2009 | Akella |
| 7,752,326 B2 | 7/2010 | Smit |
| 7,783,630 B1 | 8/2010 | Chevalier |
| 7,836,044 B2 | 11/2010 | Kamvar |
| 8,027,990 B1 | 9/2011 | Mysen |
| 8,055,673 B2 | 11/2011 | Churchill |
| 8,060,639 B2 | 11/2011 | Smit |
| 8,082,278 B2 | 12/2011 | Agrawal |
| 8,112,529 B2 | 2/2012 | Van Den Oord |
| 8,135,721 B2 | 3/2012 | Joshi |
| 8,145,636 B1 | 3/2012 | Jeh |
| 8,180,804 B1 | 5/2012 | Narayanan |
| 8,185,558 B1 | 5/2012 | Narayanan |
| 8,239,364 B2 | 8/2012 | Wable |
| 8,244,848 B1 | 8/2012 | Narayanan |
| 8,271,471 B1 | 9/2012 | Kamvar |
| 8,271,546 B2 | 9/2012 | Gibbs |
| 8,301,639 B1 | 10/2012 | Myllymaki |
| 8,306,922 B1 | 11/2012 | Kunal |
| 8,312,056 B1 | 11/2012 | Peng |
| 8,321,364 B1 | 11/2012 | Gharpure |
| 8,364,709 B1 | 1/2013 | Das |
| 8,386,465 B2 | 2/2013 | Ansari |
| 8,407,200 B2 | 3/2013 | Wable |
| 8,412,749 B2 | 4/2013 | Fortuna |
| 8,538,960 B2 | 9/2013 | Wong |
| 8,572,129 B1 | 10/2013 | Lee |
| 8,578,274 B2 | 11/2013 | Druzgalski |
| 8,595,297 B2 | 11/2013 | Marcucci |
| 8,601,027 B2 | 12/2013 | Behforooz |
| 8,606,721 B1 | 12/2013 | Dicker |
| 8,639,725 B1 | 1/2014 | Udeshi |
| 8,732,208 B2 | 5/2014 | Lee |
| 8,751,521 B2 | 6/2014 | Lee |
| 8,775,324 B2 | 7/2014 | Zhu |
| 8,782,080 B2 | 7/2014 | Lee |
| 8,782,753 B2 | 7/2014 | Lunt |
| 8,832,111 B2 | 9/2014 | Venkataramani |
| 8,868,590 B1 | 10/2014 | Donneau-Golencer |
| 8,868,603 B2 | 10/2014 | Lee |
| 8,898,226 B2 | 11/2014 | Tiu |
| 8,909,637 B2 | 12/2014 | Patterson |
| 8,914,392 B2 | 12/2014 | Lunt |
| 8,918,418 B2 | 12/2014 | Lee |
| 8,924,406 B2 | 12/2014 | Lunt |
| 8,935,255 B2 | 1/2015 | Sankar |
| 8,935,261 B2 | 1/2015 | Pipegrass |
| 8,935,271 B2 | 1/2015 | Lassen |
| 8,949,232 B2 | 2/2015 | Harrington |
| 8,949,250 B1 | 2/2015 | Garg |
| 8,949,261 B2 | 2/2015 | Lunt |
| 8,954,675 B2 | 2/2015 | Venkataramani |
| 8,983,991 B2 | 3/2015 | Sankar |
| 2002/0059199 A1 | 5/2002 | Harvey |
| 2002/0086676 A1 | 7/2002 | Hendrey |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0172237 A1 | 9/2004 | Saldanha |
| 2004/0215793 A1 | 10/2004 | Ryan |
| 2004/0243568 A1 | 12/2004 | Wang |
| 2004/0255237 A1 | 12/2004 | Tong |
| 2005/0091202 A1 | 4/2005 | Thomas |
| 2005/0125408 A1 | 6/2005 | Somaroo |
| 2005/0131872 A1 | 6/2005 | Calbucci |
| 2005/0171955 A1 | 8/2005 | Hull |
| 2005/0256756 A1 | 11/2005 | Lam |
| 2006/0041597 A1 | 2/2006 | Conrad |
| 2006/0117378 A1 | 6/2006 | Tam |
| 2006/0136419 A1 | 6/2006 | Brydon |
| 2006/0190436 A1 | 8/2006 | Richardson |
| 2007/0174304 A1 | 7/2007 | Shrufi |
| 2007/0277100 A1 | 11/2007 | Sheha |
| 2008/0005064 A1 | 1/2008 | Sarukkai |
| 2008/0033926 A1 | 2/2008 | Matthews |
| 2008/0072180 A1 | 3/2008 | Chevalier |
| 2008/0114730 A1 | 5/2008 | Larimore |
| 2008/0183694 A1 | 7/2008 | Cane |
| 2008/0183695 A1 | 7/2008 | Jadhav |
| 2008/0270615 A1 | 10/2008 | Centola |
| 2009/0006543 A1 | 1/2009 | Smit |
| 2009/0054043 A1 | 2/2009 | Hamilton |
| 2009/0094200 A1 | 4/2009 | Baeza-Yates |
| 2009/0164408 A1 | 6/2009 | Grigorik |
| 2009/0164431 A1 | 6/2009 | Zivkovic |
| 2009/0164929 A1 | 6/2009 | Chen |
| 2009/0183084 A1* | 7/2009 | Robertson .............. G06Q 10/06 715/744 |
| 2009/0197681 A1 | 8/2009 | Krishnamoorthy |
| 2009/0210195 A1* | 8/2009 | Thampy ............... G06F 17/3089 702/181 |
| 2009/0228296 A1 | 9/2009 | Ismalon |
| 2009/0259624 A1 | 10/2009 | DeMaris |
| 2009/0259646 A1 | 10/2009 | Fujita |
| 2009/0265326 A1 | 10/2009 | Lehrman |
| 2009/0271370 A1 | 10/2009 | Jagadish |
| 2009/0276414 A1 | 11/2009 | Gao |
| 2009/0281988 A1 | 11/2009 | Yoo |
| 2009/0299963 A1 | 12/2009 | Pippori |
| 2010/0049802 A1 | 2/2010 | Raman |
| 2010/0057723 A1 | 3/2010 | Rajaram |
| 2010/0082695 A1 | 4/2010 | Hardt |
| 2010/0125562 A1 | 5/2010 | Nair |
| 2010/0145771 A1 | 6/2010 | Fligler |
| 2010/0179929 A1 | 7/2010 | Yin |
| 2010/0197318 A1 | 8/2010 | Petersen |
| 2010/0228744 A1 | 9/2010 | Craswell |
| 2010/0235354 A1 | 9/2010 | Gargaro |
| 2010/0321399 A1 | 12/2010 | Ellren |
| 2011/0022602 A1 | 1/2011 | Luo |
| 2011/0078166 A1 | 3/2011 | Oliver |
| 2011/0087534 A1 | 4/2011 | Strebinger |
| 2011/0137902 A1 | 6/2011 | Wable |
| 2011/0184981 A1 | 7/2011 | Lu |
| 2011/0191371 A1 | 8/2011 | Elliott |
| 2011/0196855 A1 | 8/2011 | Wable |
| 2011/0225265 A1* | 9/2011 | Dixon .................... G06Q 30/02 709/217 |
| 2011/0231296 A1 | 9/2011 | Gross |
| 2011/0276396 A1 | 11/2011 | Rathod |
| 2011/0313992 A1 | 12/2011 | Groeneveld |
| 2011/0320470 A1 | 12/2011 | Williams |
| 2012/0047147 A1 | 2/2012 | Redstone |
| 2012/0059708 A1 | 3/2012 | Galas |
| 2012/0071236 A1* | 3/2012 | Ocko ...................... A63F 13/12 463/29 |
| 2012/0136852 A1 | 5/2012 | Geller |
| 2012/0166432 A1 | 6/2012 | Tseng |
| 2012/0166433 A1 | 6/2012 | Tseng |
| 2012/0179637 A1 | 7/2012 | Juan |
| 2012/0185472 A1 | 7/2012 | Ahmed |
| 2012/0185486 A1 | 7/2012 | Voigt |
| 2012/0209832 A1 | 8/2012 | Neystadt |
| 2012/0221581 A1 | 8/2012 | Narayanan |
| 2012/0271831 A1 | 10/2012 | Narayanan |
| 2012/0278127 A1 | 11/2012 | Kirakosyan |
| 2012/0284329 A1 | 11/2012 | Van Den Oord |

(56) References Cited

U.S. PATENT DOCUMENTS

| | | |
|---|---|---|
| 2012/0290950 A1 | 11/2012 | Rapaport |
| 2012/0310922 A1 | 12/2012 | Johnson |
| 2012/0311034 A1 | 12/2012 | Goldband |
| 2012/0317088 A1 | 12/2012 | Pantel |
| 2012/0331063 A1 | 12/2012 | Rajaram |
| 2013/0031106 A1 | 1/2013 | Schechter |
| 2013/0031113 A1 | 1/2013 | Feng |
| 2013/0041876 A1 | 2/2013 | Dow |
| 2013/0066876 A1 | 3/2013 | Raskino |
| 2013/0073400 A1 | 3/2013 | Heath |
| 2013/0085970 A1 | 4/2013 | Karnik |
| 2013/0086024 A1 | 4/2013 | Liu |
| 2013/0086057 A1 | 4/2013 | Harrington |
| 2013/0097140 A1 | 4/2013 | Scheel |
| 2013/0124538 A1 | 5/2013 | Lee |
| 2013/0124542 A1 | 5/2013 | Lee |
| 2013/0124634 A1* | 5/2013 | Weinstein .............. H04L 51/06 709/204 |
| 2013/0144899 A1 | 6/2013 | Lee |
| 2013/0159112 A1* | 6/2013 | Schultz ................. G06Q 30/02 705/14.66 |
| 2013/0184059 A1* | 7/2013 | Costello ............. G07F 17/3223 463/22 |
| 2013/0184079 A1* | 7/2013 | Costello ................ A63F 9/24 463/42 |
| 2013/0191372 A1 | 7/2013 | Lee |
| 2013/0191416 A1 | 7/2013 | Lee |
| 2013/0198219 A1 | 8/2013 | Cohen |
| 2013/0204737 A1 | 8/2013 | Agarwal |
| 2013/0226918 A1 | 8/2013 | Berkhim |
| 2013/0227011 A1 | 8/2013 | Sharma |
| 2013/0246404 A1 | 9/2013 | Annau |
| 2013/0254305 A1 | 9/2013 | Cheng |
| 2014/0006416 A1 | 1/2014 | Leslie |
| 2014/0067535 A1 | 3/2014 | Rezaei |
| 2014/0122465 A1 | 5/2014 | Bilinski |
| 2014/0282400 A1* | 9/2014 | Moorthi ................. G06F 8/71 717/122 |
| 2015/0026522 A1* | 1/2015 | Young ............... G06Q 30/0243 714/38.1 |

OTHER PUBLICATIONS

U.S. Appl. No. 13/922,144, filed Jun. 19, 2013, Shao.
U.S. Appl. No. 13/939,093, filed Jul. 10, 2013, Marlow.
U.S. Appl. No. 14/990,611, filed Jan. 7, 2016, Marlow.
Allen, K. et al, "A/B Testing," http://en.wikipedia.org/w/index.php?oldid=547499189, 2012.
Aronow, P. et al.,, Estimating average causal effects under general interference, *Working Paper*, http://arxiv.org/abs/1305.6156, May 27, 2013.
Backstrom, L. et al., "Network bucket testing," *WWW 2011*, Apr. 2011.
Bollobás, B., "The Evolution of Random Graphs-the Giant Component," Chapter 6, *Cambridge Univ. Press*, (2nd ed.), pp. 130-159, 2001.
Cellai, D., et al., "Critical phenomena in heterogeneous k-core percolation," *Phys Rev E*, 87(2):022134, 2013.
Fienberg, S., A brief history of statistical models for network analysis and open challenges,*J. Comp. Graph. Stat.*, 21(4), pp. 825-939, Oct. 19, 2012.
Fortunato, S., "Community detection in graphs," *Physics Reports*, 486(3):75-174, 2010.
Gupta, A. et al., "Bounded geometries, fractals, and low-distortion embeddings," *FOCS '03*, 2003.
Horvitz, D. et al., "A generalization of sampling without replacement from a finite universe," *JASA*, 47(260), 663-685, Dec. 1952.
Kao, E. et al., "Causal estimation of peer influence effects," *ICML*, Poster, 2013.
Karger, D. et al, "Finding nearest neighbors in growth-restricted metrics," *STOC '02*, May 2002.
Katzir, L. et al., Framework and algorithms for network bucket testing, *WWW 2012*, Apr. 2012.
Kohavi, R., Trustworthy online controlled experiments: five puzzling outcomes explained, *KDD 12*, Aug. 2012.
Manski, C., Identification of treatment response with social interactions, "*The Econometrics Journal*," 16(1):S1-S23, 2013.
Rubin, D., "Estimating causal effects of treatments in randomized and nonrandomized studies," *J. Ed. Psych.*, 66(5) pp. 688-701, 1974.
Tchetgen, E. et al., "On causal inference in the presence of interference," *Stat. Meth. Med. Res.* 21(1) pp. 55-75, Jan. 16, 2012.
Ugander, J. et al., "Balanced label propagation for partitioning massive graphs," *WSDM '13*, Feb. 2013.
Ugander, J. et al., "Graph Cluster Randomization: Network Exposure to Multiple Universes," 9 pp., available at http://arxiv.org/abs/1305.6979, May 30, 2013.
Ugander, J. et al.,"Network exposure to multiple universes," http://bit.ly/nips12-ukbk, 10 pp., Dec. 2012.
Ugander, J. et al.,"Network exposure to multiple universes," http://bit.ly/nips12-ukbk2, Poster, 1 p., Dec. 2012.
Watts, Duncan J. et al., "Collective dynamics of 'small-world' networks," *Nature*, 393(6684):440-442, 1998.
International Search Report and Written Opinion for International Application PCT/US2014/047261, dated Nov. 18, 2014.
Examination Report No. 2 for Standard Patent Application No. 2016203272, dated May 11, 2017.
Examination Report No. 1 for Standard Patent Application 2016203272, dated Feb. 8, 2017.
Examination Report No. 3 for AU Patent Application No. 2016203272, dated Dec. 5, 2017.

* cited by examiner

NATIVE APPLICATION TESTING

PRIORITY

This application is a continuation under 35 U.S.C. § 120 of U.S. patent application Ser. No. 13/948,893, filed 23 Jul. 2013.

TECHNICAL FIELD

This disclosure generally relates to online social networks and launching features or products in online environments.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing system of a user. A user may also install software applications on a mobile or other computing system of the user for accessing a user profile of the user and other data within the social-networking system. The social-networking system may generate a personalized set of content objects to display to a user, such as a newsfeed of aggregated stories of other users connected to the user.

A/B testing is a standard approach for evaluating the effects of online experiments. A/B testing typically uses randomized experiments with two variants (typically referred to as A and B), which represent the control and treatment in the experiment. Such experiments are commonly used in web development and marketing, as well as in more traditional forms of advertising. In online settings, the objective is typically to determine how changes to the online environment affect user behavior with the environment. The control and treatment groups are compared, which are generally identical except for a single variation that might impact a user's behavior.

SUMMARY OF PARTICULAR EMBODIMENTS

In particular embodiments, the social-networking system may improve how new products, features, advertisements, or experiences ("treatments") are launched to users of the online social network by providing users with native application that include treatments that can be controlled and monitored remotely. A/B testing is a standard approach for evaluating the effect of online experiments. The goal is typically to estimate the average treatment effect of a new product, feature, or condition by exposing a sample of the overall population to it. In particular embodiments, the experiments may also include measuring a matrix of parameters (e.g., a number of likes, a number of comments, revenue generated, etc.) against a set of users to determine the effectiveness of the particular treatment. The problem is that while a treatment may be activated on a particular client system, particular events may cause the treatment to be disabled. For example, a cache-clearing event (e.g., a clearing of settings files, temporary files, cookies, or other cached objects that specify whether a particular treatment should be active on the application) or a deletion event (e.g., the user deletes and re-installs the application) may reset the application so that it does not provide the treatment to the user. By synchronizing activation of the treatment between the client systems and the social-networking system, the experiment can be run so that users are effectively maintained in the treatment group, even if there is a cache-clearing or deletion event. In this way, the A/B experiment can be run so that users are effectively maintained in the treatment group, even if there is a cache-clearing or deletion event. Data received from this first set of users can then be analyzed to determine the treatment effect of the treatment on those users. The treatment may then be modified before being rolled out to users in the next set of users.

DESCRIPTION OF EXAMPLE EMBODIMENTS

Figure 1:
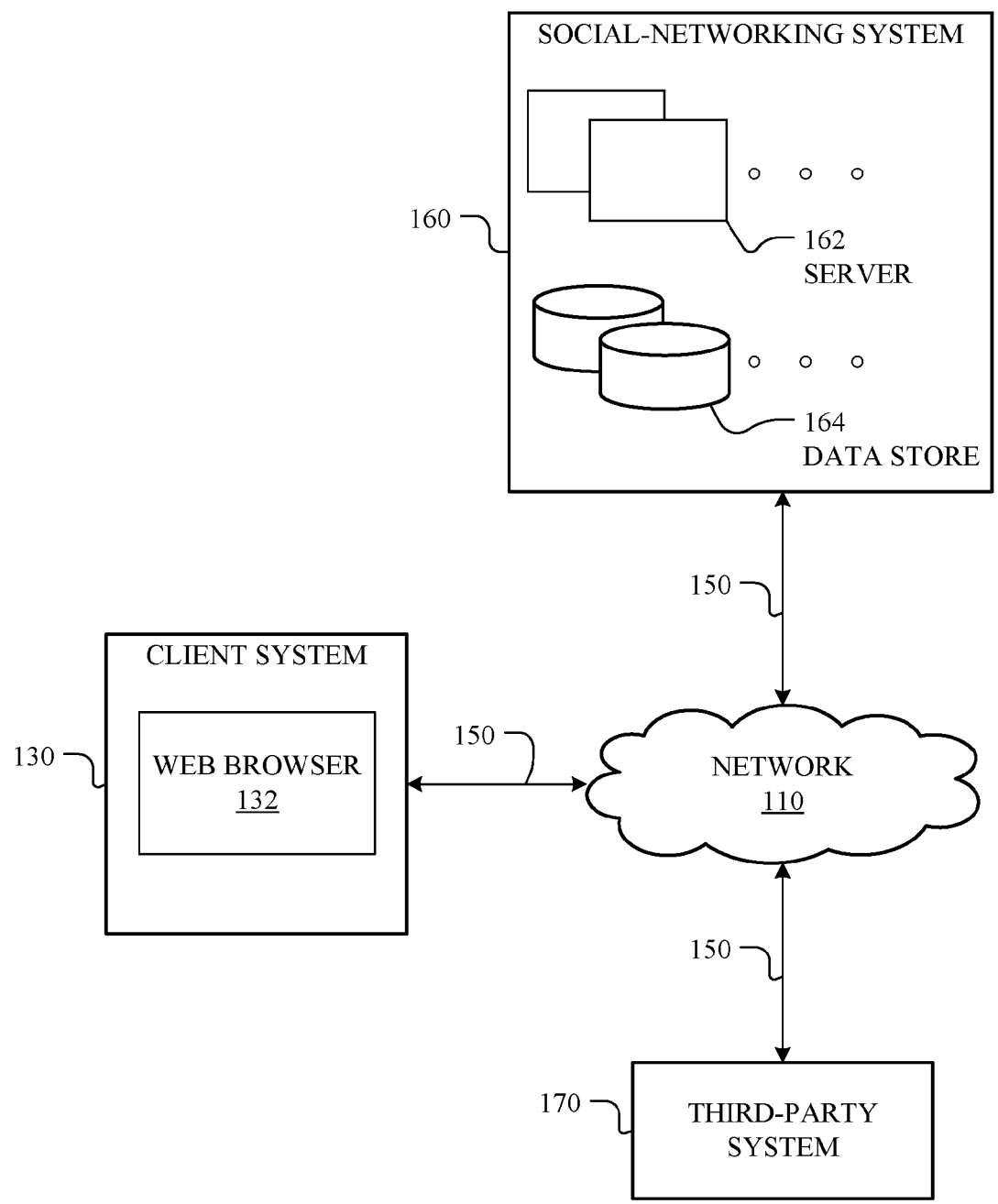
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 164 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
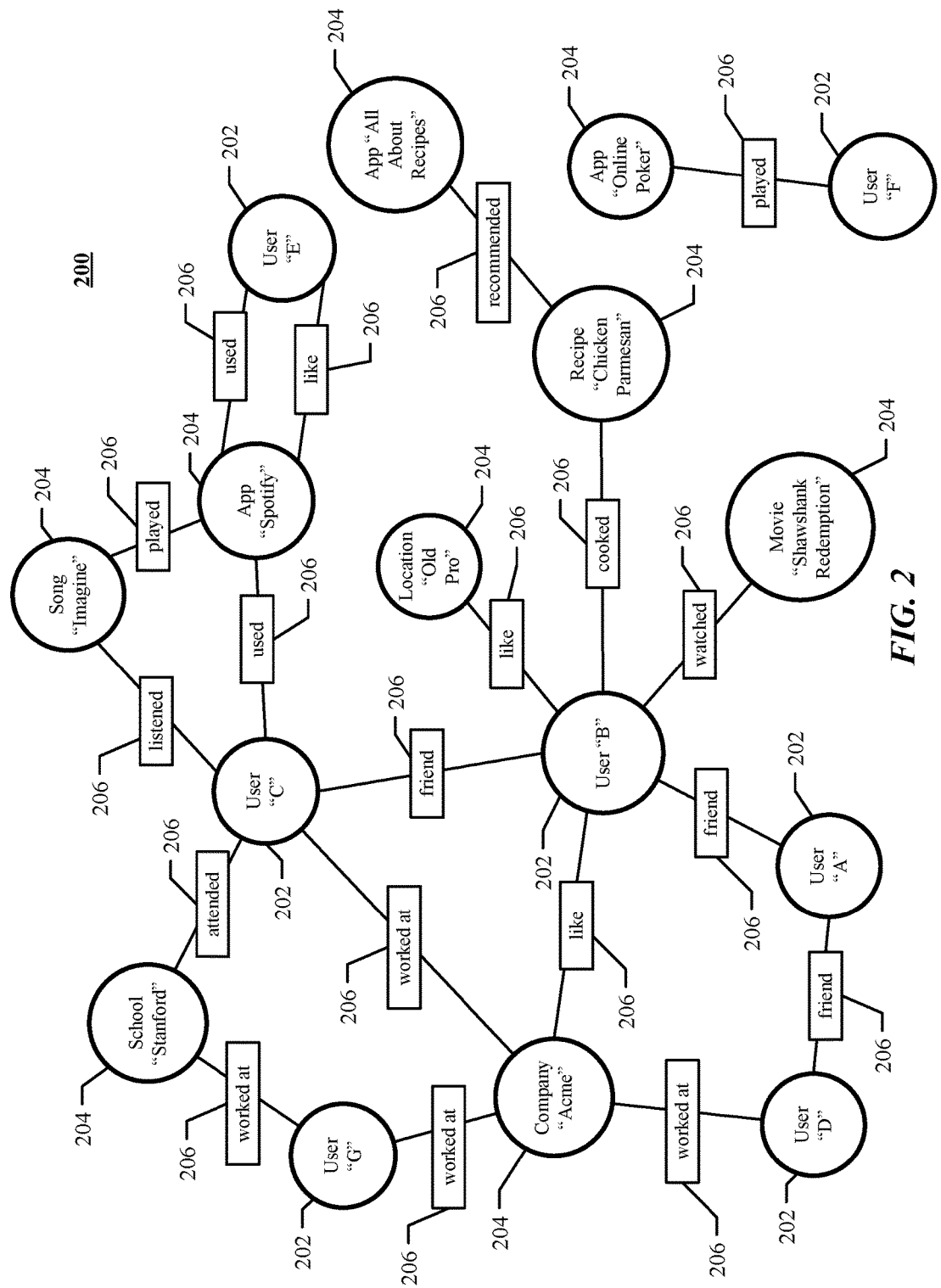
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to send to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, social-networking system 160 may improve how new products, features, advertisements, or experiences ("treatments") are launched to users of the online social network by providing users with native application that include treatments that can be controlled and monitored remotely. A/B testing is a standard approach for evaluating the effect of online experiments. The goal is typically to estimate the average treatment effect of a new product, feature, or condition by exposing a sample of the overall population to it. In particular embodiments, the experiments may also include measuring a matrix of parameters (e.g., a number of likes, a number of comments, revenue generated, etc.) against a set of users to determine the effectiveness of the particular treatment. The problem is that while a treatment may be activated on a particular client system 130, particular events may cause the treatment to be disabled. For example, a cache-clearing event (e.g., a clearing of settings files, temporary files, cookies, or other cached objects that specify whether a particular treatment should be active on the application) or a deletion event (e.g., the user deletes and re-installs the application) may reset the application so that it does not provide the treatment to the user. By synchronizing activation of the treatment between client systems 130 and social-networking system 160, the experiment can be run so that users are effectively maintained in the treatment group, even if there is a cache-clearing or deletion event. In this way, the A/B experiment can be run so that users are effectively maintained in the treatment group, even if there is a cache-clearing or deletion event. Data received from this first set of users can then be analyzed to determine the treatment effect of the treatment on those users. The treatment may then be modified before being rolled out to users in the next set of users. This stepwise approach to rolling out the treatment may be taken until the treatment has been provided to all users of the online social network. Although this disclosure describes providing treatments to users and determining treatment effects in a particular manner, this disclosure contemplates providing treatments to user or determining treatment effects in any suitable manner.

In the A/B testing approach, it is important to make sure a user in the treatment group is actually being exposed to the treatment. When a new product, feature, etc., is rolled out in a desktop environment (e.g., via a web browser 132), social-networking system 160 can determine user exposure to the treatment (or lack of it) as part of the user's viewing of the webpage servers by social-networking system 160. However, where social-networking system 160 is accessed via a native application installed on a client system 130 (e.g., from an app on a mobile client), user exposure to the treatment is not necessarily certain because social-networking system 160 may not always be able to detect what the user is viewing or doing on the native application, whether the native application has been deleted from client system 130, whether usage data related to the native application has been cleared from a cache on client system 130, and so on. These uncertainties in user exposure to the native application may reduce accuracy in measuring the matrix of parameters for determining effectiveness of the treatment.

In particular embodiments, social-networking system 160 may deploy an application to a plurality of client systems 130 associated with a plurality of users, respectively. The application may be installed on each of the client systems 130. As an example and not by way of limitation, a native application may be installed on a mobile client system 130 that allows the user to access social-networking system 160 via the native application rather than via a web browser 132. In particular embodiments, one or more treatments may be remotely activated on the application. For AB randomized experiments, the treatment condition of an individual decides whether or not they are subject to an intervention. This typically takes two values: 'treatment' or 'control'. In most randomized experiments, the experimenter has explicit control over how to randomize the treatment conditions, and generally individuals are assigned independently. Meanwhile, the exposure condition of an individual determines how they experience the intervention in full conjunction with how the world experiences the intervention. As an example and not by way of limitation, the native application may include functionality so that particular features or experiences are included with the application, but not necessarily provided to the user. In other words, the native application may include one or more optional treatments. These treatments may be activated, for example, in response to instructions from social-networking system 160 to activate a specific feature or experience in the native application. The treatments may be remotely activated on a user-by-user basis, such that, for example, particular user may be provided with a treatment, while others may not. Although this disclosure describes deploying particular applications in a particular manner, this disclosure contemplates deploying any suitable applications in any suitable manner.

In particular embodiments, social-networking system 160 may provide a treatment to a first set of client systems 130 corresponding to a first set of users, respectively. The treatment may be, for example, a particular advertisement, product, feature, experience, other suitable treatment, or any combination thereof. Under ordinary randomized trials where the stable unit treatment value assumption is a reasonable approximation (such as, for example, when a search engine AB tests the effect of their color scheme upon the visitation time of their users) the population is divided into two groups: those in the "treatment" group (who see the new color scheme A) and those in the control group (who see the default color scheme B). Assuming there are negligible interference effects between users, each individual in the treated group responds just as he or she would if the entire population were treated, and each individual in the control group responds just as he or she would if the entire population were in control. In this manner, we may imagine that we are observing results from samples of two distinct "parallel universes" at the same time (for example, "Universe A" in which color scheme A is used for everyone, and "Universe B" in which color scheme B is used for everyone) and we may make inferences about the properties of user behavior in each of these universes. The treatment may be provided via the online social network or via a third-party system 170. Social-networking system 160 may then determine a treatment effect of the treatment for the users of the first set of users. Although this disclosure described proving particular treatments in a particular manner, this disclosure contemplates providing any suitable treatments in any suitable manner.

In particular embodiments, social-networking system 160 may synchronize with client systems 130 to provide a treatment to the client system 130. This may allow social-networking system 160 to accurately record exposure and usage of a native application locally installed at a client system 130. Client system 130 may synchronize the states of the native application with social-networking system 160 by sending back to social-networking system 160 events corresponding to changes in states of the native application on client system 130. As an example and not by way of limitation, the events sent to social-networking system 160 may be a deployment event, an exposure event, a cache-clearing event, or a conversion event associated with the native application. By receiving those events from multiple client systems 130, social-networking system 160 may construct accurate logs of exposure and usage of the native app at those client systems 130, and calculate the matrix of parameters accurately. As an example and not by way of limitation, social-networking system 160 may receive a request from an application installed on the client system 130 to access social-networking system 160. Social-networking system 160 may then determine whether the client system belongs in a treatment group associated with the treatment. If the client system 130 belongs in the treatment group, social-networking system 160 may remotely activate the treatment on the client system 130. Similarly, if the client system 130 belongs in a control group, social-networking system 160 may not activate any treatments (or, if the treatment was for some reason activated, social-networking system 160 may at that point deactivate the treatment). In response to subsequent access by the client system 130, social-networking system 160 may synchronize activation of the treatment. The treatment may have been deactivated for a variety of reasons, such that social-networking system 160 needs to determine whether the client system 130 is still providing the treatment to the user. For example, in response to a subsequent access by the client system 130, social-networking system 160 may determine whether the treatment is still active on the client system 130. If so, then no action may need to be taken. However, if the treatment is determined to be not active on the client system 130, social-networking system 160 may remotely re-active the treatment on the client system 130. In this way, the AB experiment can be run so that users are effectively maintained in the treatment group, even if there is a cache-clearing or deletion event. Although this disclosure describes synchronizing particular treatments in a particular manner, this disclosure contemplates synchronizing any suitable treatments in any suitable manner.

In particular embodiments, social-networking system 160 may deactivate the treatment on the first set of client systems 130 after a specified timeout period. Any suitable timeout period may be used. As an example and not by way of limitation, the treatment on the native application may timeout eight weeks after being activated on client system 130. As another example and not by way of limitation, the treatment may timeout on a specified date. The timeout period may be specified on a user-by-user basis (e.g., eight weeks after the particular customer installed the application), or on a global basis (e.g., eight weeks after the experiment began, regardless of when during that period a user entered the experiment). Deactivating the treatment means that the product, feature, experience, etc. that comprised the treatment would stop being provided to the user. After timing out, the user may then be provided with the default (e.g., control) product/experience on the native application. In particular embodiments, client system 130 may send a timeout event to social-networking system 160. In this way, social-networking system 160 may not need to track all the experiments associated with the native app, thus improving overall productivity and development efficiency. Although this disclosure describes deactivating treatments in a particular manner, this disclosure contemplates deactivating treatments in any suitable manner.

In particular embodiments, social-networking system 160 may provide the treatment to clusters of users in a network-aware manner. Social-networking system 160 may identify a plurality of clusters in social graph 200 using graph cluster randomization. Each identified cluster may comprise a discrete set of nodes from the plurality of nodes of social graph 200. In particular embodiments, social-networking system 160 may specify clusters such that a threshold number of nodes in each cluster may be network exposed with respect to the other nodes in the cluster. In particular embodiments, social-networking system 160 may identify clusters based at least in part on the social-graph affinity of users with respect to each other. Rather than just clustering users based on being neighbors in social graph 200 (i.e., being connected by an edge 206), social-networking system 160 may cluster neighbors having a relatively high social-graph affinity for each other. In other words, user i may be clustered with j neighbors having above a threshold affinity with respect to user i, while neighbors having less affinity for user i may not necessarily be included in the cluster. Although this disclosure describes identifying clusters with network exposure in a particular manner, this disclosure contemplates identifying clusters with network exposure in any suitable manner. In connection with identifying and selecting user sets, particular embodiments may utilize one or more systems, components, elements, functions, methods, operations, or steps disclosed in U.S. patent application Ser. No. 13/933,093, filed 10 Jul. 2013, which is incorporated by reference.

In particular embodiments, social-networking system 160 may receive treatment data from the first set of client systems 130. Social-networking system 160 may calculate a matrix of parameters based on the set of users that were exposed to a particular treatment of the native application (as determined by the events sent back to social-networking system 160) during a specified period of time. For the same period of time, social-networking system 160 may also construct a control group including users who were not exposed to the particular treatment of the native application while accessing social-networking system 160 from their client systems 130 during the same period of time. In particular embodiments, social-networking system 160 may receive exposure data from the first set of client systems. The exposure data for each client system 130 may identify an exposure of the user of the client system 130 the treatment. As an example and not by way of limitation, if the treatment is a particular advertisement, the exposure data may identify whether the advertisement was displayed to the user of the native application. In particular embodiments, social-networking system 160 may receive conversion data from the first set of client systems. The conversion data for each client system 130 may identify user interactions with respect to the treatment. As an example and not by way of limitation, continuing with the prior example, if the treatment was an advertisement, the conversion data may identify whether clicked on or otherwise interacted with the advertisement. Although this disclosure describes receiving particular treatment data in a particular manner, this disclosure contemplates receiving any suitable treatment data in any suitable manner.

In particular embodiments, social-networking system 160 may determine a treatment effect of a treatment for the users of a first set of users. Social-networking system 160 may test a treatment by providing it to a subset of users of the online social network. In particular embodiments, the treatment may have a "social" component in that i's reaction to the treatment depends on whether a neighbor j in the online social network also has the treatment. This social component may also be referred to as the network effect of the treatment. As an example and not by way of limitation, particular treatments may exhibit social components, such as, for example, social advertisements, text/video chat, messaging, social networking, etc. For example, for text/video chatting features, those features are only useful if user i has one or more neighbors j to chat with. An individual/user is considered to be in the treatment group if the individual is provided with the treatment for the test, and in the control group otherwise. There may be an underlying numerical response variable of interest (for example, the user's time-on-site in each condition), and social-networking system 160 may estimate the average of this response in both the universe where everyone has the service, and the universe where no one has the service. Let $\vec{z} \in \{0,1\}^n$ be the treatment assignment vector, where $z_i=1$ means that user i is in the treatment group and $z_i=0$ means the user i is in the control. Let $Y_1(\vec{z}') \in R$ be the potential outcome of user i under the treatment assignment vector $\vec{z}$. We are interested in is the average treatment effect, $\tau$, between the two groups $\vec{z}=\vec{1}$, and $\vec{z}'=\vec{0}$, where the average treatment effect may be calculated as:

$$\tau(\vec{z}=\vec{1}, \vec{z}'=\vec{0}) = \frac{1}{n} \sum_{i=1}^{n} \left[ Y_i(\vec{z}=\vec{1}) - Y_i(\vec{z}'=\vec{0}) \right].$$

In particular embodiments, social-networking system 160 may determine both an individual effect of the treatment for the users and the network effect of the treatment for the users. The treatment effect of a particular treatment may be a function of both the network effect and the individual effect. The non-social component of the treatment may be referred to as the individual effect of the treatment. A treatment has an individual component in that i's reaction to the treatment does not depend on whether a neighbor j in the online social network also has the treatment. As an example and not by way of limitation, a social advertisement to user i may have an individual effect with respect to user i that is independent of whether one or more neighbors j are also exposed to social advertisements (although, of course, social advertisements may also have a network effect). Distinguishing and measuring both the individual and network effects of a particular treatment may be useful for determining how to best modify a treatment in order to increase or improve user engagement with the treatment. Although this disclosure describes determining treatment effects in a particular manner, this disclosure contemplates determining treatment effects in any suitable manner.

In particular embodiments, social-networking system 160 may provide the treatment to a second set of users. The processed described herein may then be repeated as necessary until the treatment has been provided to all users of the online social network. In this way, an advertisement, feature, or product may be rolled-out out to users of the online social network. In particular embodiments, after the treatment effect has been determined for the first set of users, social-networking system 160 may modify the treatment based on the determined treatment effect of the treatment. The advertisement, feature, or product may be modified based on the determined treatment effect to, for example, optimize a user's interactions or experience with the treatment. The modified treatment may then be provided to an additional set of users, and successively modified and rolled-out to additional users until, for example, it has been sufficiently improved and can be launched to the entire online social network. Although this disclosure describes providing a treatment and determining treatment effects in a particular manner, this disclosure contemplates providing a treatment or determining treatment effects in any suitable manner.

Figure 3:
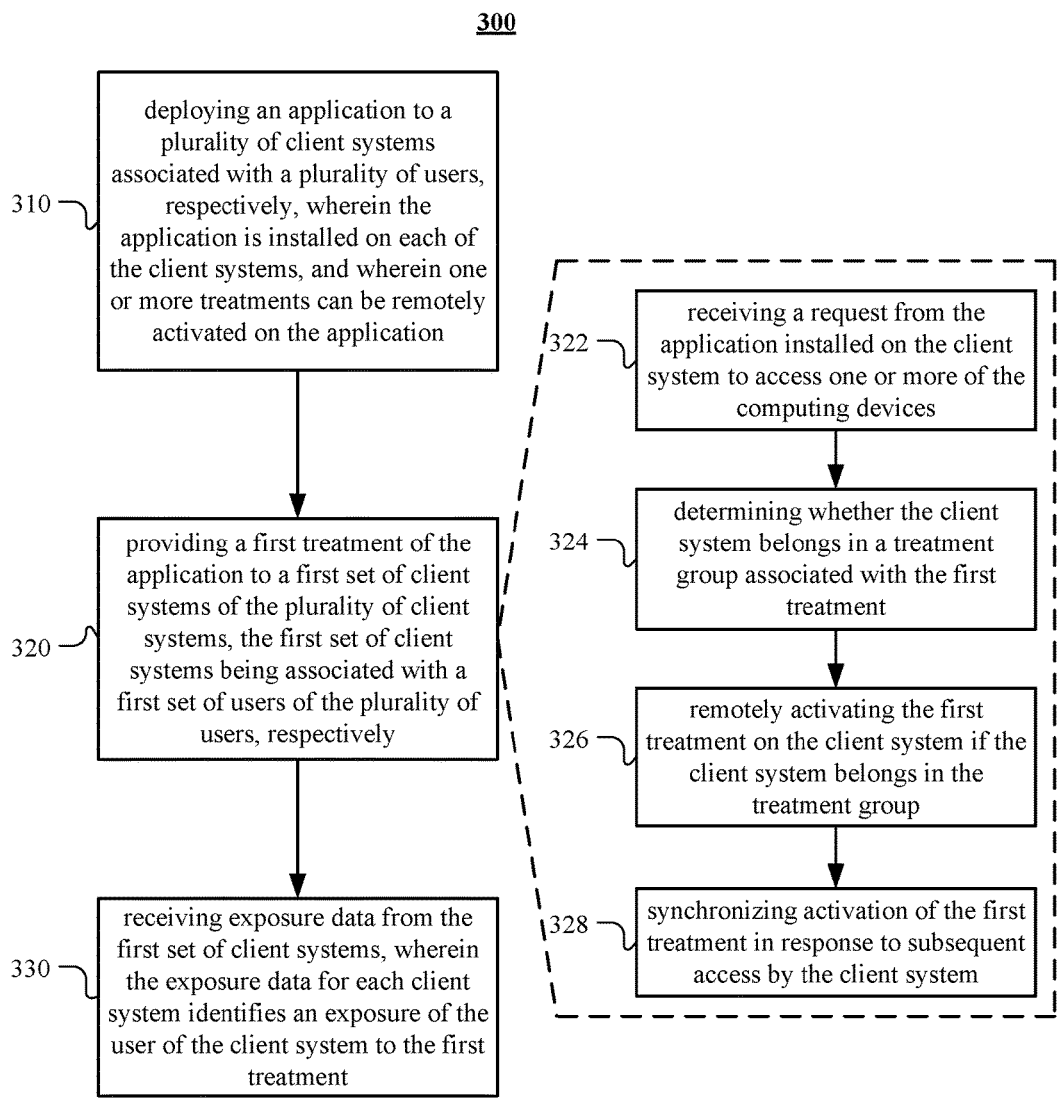
FIG. 3 illustrates an example method for testing native applications on remote clients.

FIG. 3 illustrates an example method 300 for testing native applications on remote clients. The method may begin at step 310, where social-networking system 160 may deploy an application to a plurality of client systems 130 associated with a plurality of users, respectively. The application may be installed on each of the client systems 130. Furthermore, one or more treatments may be able to be remotely activated on the application. At step 320, social-networking system 160 may provide a first treatment of the application to a first set of client systems 130 of the plurality of client systems 130. The first set of client systems 130 may be associated with a first set of users of the plurality of users, respectively. In particular embodiments, step 320 may comprise one or more of the following sub-steps: At step 322, social-networking system 160 may receive a request from the application installed on the client system 130 to access one or more of the computing devices of social-networking system 160. At step 324, social-networking system 160 may determine whether the client system 130 belongs in a treatment group associated with the first treatment. At step 326, social-networking system 160 may remotely activate the first treatment on the client system 130 if the client system 130 belongs in the treatment group. At step 328, social-networking system 160 may synchronize activation of the first treatment in response to subsequent access by the client system 130. At step 330, social-networking system 160 may receive exposure data from the first set of client systems 130. The exposure data for each client system 130 may identify an exposure of the user of the client system 130 to the first treatment. Particular embodiments may repeat one or more of the steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for testing native applications on remote clients including the particular steps of the method of FIG. 3, this disclosure contemplates any suitable method for testing native applications on remote clients including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content. In particular embodiments, one or more advertisements may be tested on one or more clusters of users of the online social network using network-aware product rollout techniques described previously.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 160 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 160) or RSVP (e.g., through social-networking system 160) to an event associated with the advertisement. In addition or as an alternative, an advertisement may include social-networking-system context directed to the user. As an example and not by way of limitation, an advertisement may display information about a friend of the user within social-networking system 160 who has taken an action associated with the subject matter of the advertisement.

Figure 4:
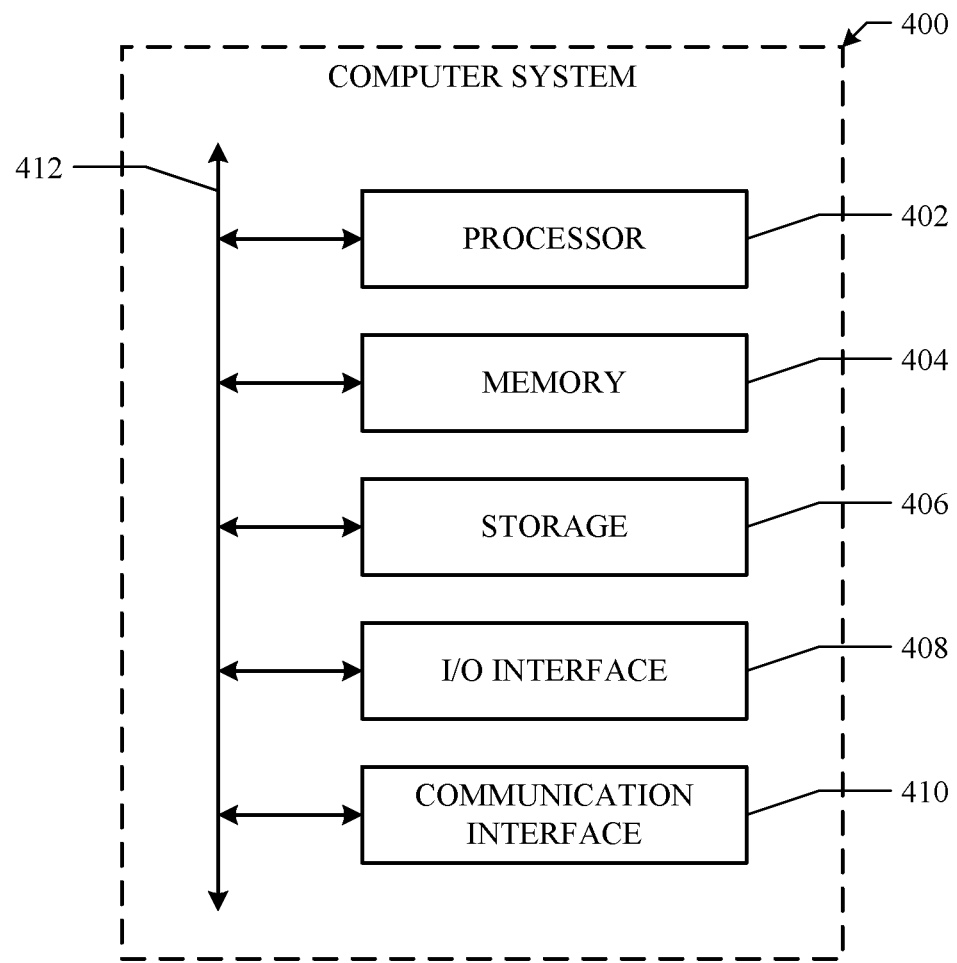
FIG. 4 illustrates an example computer system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by an application server:
   deploying, by the application server, an application to a plurality of client systems associated with a plurality of users, respectively, wherein the application is installed on each of the client systems, and wherein one or more treatments can be remotely activated on the application;
   receiving, from a first client system associated with a first user of the plurality of users, a request from the application installed on the first client system to access the application server;
   determining, by the application server, whether the first user belongs in a treatment group associated with a first treatment;
   remotely activating, by the application server, the first treatment on the first client system associated with the first user if the first user belongs in the treatment group, wherein remotely activating the first treatment comprises modifying the behavior of the application installed on the first client system associated with the first user; and
   synchronizing, by the application server, remote activation of the first treatment on the application on the first client system associated with the first user in response to subsequent requests from the application installed on the first client system, wherein synchronizing remote activation of the first treatment on the application on the first client system associated with the first user comprises maintaining the first user in the treatment group and maintaining activation of the first treatment on the application on the first client system associated with the first user through one or more treatment-disabling events involving the first client system associated with the first user, wherein maintaining activation of the first treatment through a treatment-disabling event allows the first user to continue experiencing the modification of the application associated with the first treatment on the first client system after the treatment-disabling event.

2. The method of claim 1, further comprising:
   receiving, from the first client system, exposure data identifying an exposure of the first user to the first treatment.

3. The method of claim 1, further comprising:
   determining a treatment effect of the first treatment for the first user based on exposure data received from the first client system.

4. The method of claim 3, further comprising:
   modifying the first treatment based on the determined treatment effect of the first treatment.

5. The method of claim 1, further comprising:
   deactivating the first treatment on the first client system after a specified timeout period.

6. The method of claim 1, further comprising:
   receiving, from the first client system, conversion data identifying user interactions with respect to the first treatment.

7. The method of claim 1, wherein synchronizing activation of the first treatment in response to subsequent access by the first client system comprises:
   determining whether the first treatment is active on the first client system; and
   remotely re-activating the first treatment on the first client system if the first treatment is determined to be not active on the first client system.

8. The method of claim 1, further comprising:
   accessing a social graph comprising a plurality of nodes and a plurality of edges connecting the nodes, each of the edges between two of the nodes representing a single degree of separation between them, the plurality of nodes corresponding to a plurality of users associated with an online social network, respectively.

9. The method of claim 8, further comprising:
   identifying a plurality of clusters in the social graph using graph cluster randomization, each cluster comprising a discrete set of nodes from the plurality of nodes, wherein a threshold number of nodes in each cluster is network exposed with respect to the other nodes in the cluster.

10. The method of claim 9, wherein the first user corresponds to a node in a first cluster of the plurality of clusters.

11. The method of claim 10, further comprising:
    remotely activating the first treatment on one or more second client systems associated with one or more second users of the plurality of users, respectively, the one or more second client systems corresponding to one or more nodes in a second cluster of the plurality of clusters, the first cluster being discrete from the second cluster.

12. The method of claim 1, determining whether the first user belongs in the treatment group associated with a first treatment comprises determining whether the first user belongs in a treatment set of users or a control set of users.

13. The method of claim 1, wherein the first treatment is a particular advertisement.

14. The method of claim 1, wherein the first treatment is a particular product or feature associated with the application.

15. The method of claim 1, wherein the client systems are mobile client systems.

16. The method of claim 1, wherein the application server is a server associated with an online social network.

17. The method of claim 1, wherein the application is a mobile application for accessing an online social network.

18. The method of claim 1, wherein the one or more treatment-disabling events comprises one or more of:
    a cache-clearing event;
    a deletion event; or
    a deployment event.

19. The method of claim 1, wherein maintaining activation of the first treatment on the first client system through one or more treatment-disabling events comprises remotely re-activating the treatment of the application responsive to determining the treatment is inactive on the first client system following a treatment-disabling event.

20. One or more computer-readable non-transitory storage media embodying software that is operable when executed to:
    deploy, by an application server, an application to a plurality of client systems associated with a plurality of users, respectively, wherein the application is installed on each of the client systems, and wherein one or more treatments can be remotely activated on the application;
    receive, from a first client system associated with a first user of the plurality of users, a request from the application installed on the first client system to access the application server;
    determine, by the application server, whether the first user belongs in a treatment group associated with a first treatment;
    remotely activate, by the application server, the first treatment on the first client system associated with the first user if the first user belongs in the treatment group, wherein remotely activating the first treatment comprises modifying the behavior of the application installed on the first client system associated with the first user; and synchronize, by the application server, remote activation of the first treatment on the application on the first client system associated with the first user in response to subsequent requests from the application installed on the first client system, wherein synchronizing remote activation of the first treatment on the application on the first client system associated with the first user comprises maintaining the first user in the treatment group and maintaining activation of the first treatment on the application on the first client system associated with the first user through one or more treatment-disabling events involving the first client system associated with the first user, wherein maintaining activation of the first treatment through a treatment-disabling event allows the first user to continue experiencing the modification of the application associated with the first treatment on the first client system after the treatment-disabling event.

21. A system comprising: one or more processors; and a memory coupled to the processors comprising instructions executable by the processors, the processors operable when executing the instructions to:

deploy, by an application server, an application to a plurality of client systems associated with a plurality of users, respectively, wherein the application is installed on each of the client systems, and wherein one or more treatments can be remotely activated on the application;

receive, from a first client system associated with a first user of the plurality of users, a request from the application installed on the first client system to access the application server;

determine, by the application server, whether the first user belongs in a treatment group associated with a first treatment;

remotely activate, by the application server, the first treatment on the first client system associated with the first user if the first user belongs in the treatment group, wherein remotely activating the first treatment comprises modifying the behavior of the application installed on the first client system associated with the first user; and synchronize, by the application server, remote activation of the first treatment on the application on the first client system associated with the first user in response to subsequent requests from the application installed on the first client system, wherein synchronizing remote activation of the first treatment on the application on the first client system associated with the first user comprises maintaining the first user in the treatment group and maintaining activation of the first treatment on the application on the first client system associated with the first user through one or more treatment-disabling events involving the first client system associated with the first user, wherein maintaining activation of the first treatment through a treatment-disabling event allows the first user to continue experiencing the modification of the application associated with the first treatment on the first client system after the treatment-disabling event.

22. The system of claim 21, the processors being further operable when executing the instructions to:

receive, from the first client system, exposure data identifying an exposure of the first user to the first treatment.

23. The system of claim 21, the processors being further operable when executing the instructions to:

determine a treatment effect of the first treatment for the first user based on exposure data received from the first client system.

24. The system of claim 23, the processors being further operable when executing the instructions to:

modify the first treatment based on the determined treatment effect of the first treatment.

25. The system of claim 21, the processors being further operable when executing the instructions to:

deactivate the first treatment on the first client system after a specified timeout period.

26. The system of claim 21, the processors being further operable when executing the instructions to:

receive, from the first client system, conversion data identifying user interactions with respect to the first treatment.

27. The system of claim 21, wherein synchronizing activation of the first treatment in response to subsequent access by the first client system comprises:

determining whether the first treatment is active on the first client system; and remotely re-activating the first treatment on the first client system if the first treatment is determined to be not active on the first client system.

28. The system of claim 21, the processors being further operable when executing the instructions to:

access a social graph comprising a plurality of nodes and a plurality of edges connecting the nodes, each of the edges between two of the nodes representing a single degree of separation between them, the plurality of nodes corresponding to a plurality of users associated with an online social network, respectively.

29. The system of claim 28, the processors being further operable when executing the instructions to:

identify a plurality of clusters in the social graph using graph cluster randomization, each cluster comprising a discrete set of nodes from the plurality of nodes, wherein a threshold number of nodes in each cluster is network exposed with respect to the other nodes in the cluster.

30. The system of claim 29, wherein the first user corresponds to a node in a first cluster of the plurality of clusters.

31. The system of claim 30, the processors being further operable when executing the instructions to:

remotely activate the first treatment on one or more second client systems associated with one or more second users of the plurality of users, respectively, the one or more second client systems corresponding to one or more nodes in a second cluster of the plurality of clusters, the first cluster being discrete from the second cluster.

32. The system of claim 21, wherein determining whether the first user belongs in the treatment group associated with a first treatment comprises determining whether the first user belongs in a treatment set of users or a control set of users.

33. The system of claim 21, wherein the first treatment is a particular advertisement.

34. The system of claim 21, wherein the first treatment is a particular product or feature associated with the application.

35. The system of claim 21, wherein the client systems are mobile client systems.

36. The system of claim 21, wherein the application server is a server associated with an online social network.

37. The system of claim 21, wherein the application is a mobile application for accessing an online social network.

38. The system of claim 21, wherein the one or more treatment-disabling events comprises one or more of:
a cache-clearing event;
a deletion event; or
a deployment event.

39. The system of claim 21, wherein maintaining activation of the first treatment on the first client system through one or more treatment-disabling events comprises remotely re-activating the treatment of the application responsive to determining the treatment is inactive on the first client system following a treatment-disabling event.

* * * * *